United States Patent
Budagavi et al.

(10) Patent No.: US 9,591,320 B2
(45) Date of Patent: Mar. 7, 2017

(54) CONTEXT AND BYPASS ENCODING VIDEO

(75) Inventors: Madhukar Budagavi, Plano, TX (US); Mehmet Umut Demircin, Dallas, TX (US); Vivienne Sze, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1079 days.

(21) Appl. No.: 13/184,226

(22) Filed: Jul. 15, 2011

(65) Prior Publication Data

US 2012/0014454 A1 Jan. 19, 2012

Related U.S. Application Data

(60) Provisional application No. 61/364,593, filed on Jul. 15, 2010, provisional application No. 61/499,852, filed on Jun. 22, 2011.

(51) Int. Cl.
  *H04N 11/02* (2006.01)
  *H04N 19/436* (2014.01)
  *H04N 19/91* (2014.01)

(52) U.S. Cl.
  CPC .......... *H04N 19/436* (2014.11); *H04N 19/91* (2014.11)

(58) Field of Classification Search
  CPC .............................. H04N 7/12; H04N 11/02
  See application file for complete search history.

(56) References Cited

U.S. PATENT DOCUMENTS

| | | | | |
|---|---|---|---|---|
| 8,660,177 | B2* | 2/2014 | Huang et al. | 375/240.02 |
| 2009/0074057 | A1* | 3/2009 | Marpe et al. | 375/240.02 |
| 2009/0096643 | A1* | 4/2009 | Chang | 341/51 |
| 2011/0243226 | A1* | 10/2011 | Choi | H04N 19/61 375/240.12 |
| 2012/0027089 | A1* | 2/2012 | Chien | H04N 19/52 375/240.15 |
| 2012/0230417 | A1* | 9/2012 | Sole Rojals | H04N 19/00109 375/240.18 |

OTHER PUBLICATIONS

Sze et al., "A high throughput CABAC algorithm using syntax element partitioning", Nov. 10, 2009, IEEE, 2009 16th IEEE International Conference on Image Processing.*
Joint Collaborative Team on Video Coding (JCT-VC) of ITU-T SG16 WP3 and ISO/IEC JTC1/SC29/WG11 "Test Model under Consideration" Dresden, DE, Apr. 15-23, 2010.
V. Sze, M. Budagavi, "Parallel CABAC," ITU-T SG 16/Q.6 Doc. COM16-C334, Geneva, Switzerland, Apr. 2008.
M. Budagavi, V. Sze, et al., Joint Collaborative Team on Video Coding (JCT-VC) of ITU-T SG16 WP3 and ISO/IEC JTC1/SC29/WG11 "Description of Video Coding Technology Proposal by Texas Instruments, Inc." Dresden, DE, Apr. 15-23, 2010.

(Continued)

*Primary Examiner* — James M Anderson, II
(74) *Attorney, Agent, or Firm* — Charles A. Brill; Frank D. Cimino

(57) ABSTRACT

A method and apparatus for encoding and decoding video data. Including context encoding or decoding at least two bins of each significant transform coefficient in an array of transform coefficients and bypass encoding or decoding a sign indicator for each significant transform coefficient in an array related to a block of an image.

16 Claims, 5 Drawing Sheets

(56) References Cited

OTHER PUBLICATIONS

Andrew Segall, et al., Joint Collaborative Team on Video Coding (JCT-VC) of ITU-T SG16 WP3 and ISO/IEC JTC1/SC29/WG11 "A Highly Efficient and Highly Parallel System for Video Coding" Dresden, DE, Apr. 15-23, 2010.

T. Weigand, et al., Joint Collaborative Team on Video Coding (JCT-VC) of ITU-T SG16 WP3 and ISO/IEC JTC1/SC29/WG11 "Description of Video Coding Technology Proposal by Fraunhofer HHI" Dresden, DE, Apr. 15-23, 2010.

D. He, et al., Joint Collaborative Team on Video Coding (JCT-VC) of ITU-T SG16 WP3 and ISO/IEC JTC1/SC29/WG11 "Video Coding Technology Proposal by RIM" Dresden, DE, Apr. 15-23, 2010.

T. Nguyen, Joint Collaborative Team on Video Coding (JCT-VC) of ITU-T SG16 WPE and ISO/IEC JTC1/SC29/WG11 "CE 11: Coding of Transform Coefficient Levels with Golomb-Rice Codes" Geneva, CH, Mar. 16-23, 2011.

Thomas Wiegand et al., "WD2: Working Draft 2 of High-Efficiency Video Coding", JCTVC-D503, Jan. 20-28, 2011, 1-555, Joint Collaborative Team on Video Coding (JCT-VC) of ITU-T SG16 WP3 and ISO/IEC JTC1/SC29/WG11, Daegu, KR.

\* cited by examiner

# CONTEXT AND BYPASS ENCODING VIDEO

CROSS-REFERENCE TO RELATED APPLICATIONS

This application claims benefit of U.S. provisional application Ser. No. 61/499,852, filed Jun. 22, 2011, U.S. provisional patent application No. 61/499,852, filed Jun. 22, 2011, and U.S. provisional patent application Ser. No. 61/364,593, filed Jul. 15, 2010, are hereby incorporated by reference.

BACKGROUND OF THE INVENTION

Field of the Invention

Embodiments of the present invention generally relate to a method and apparatus for parallel context processing techniques for high coding efficiency entropy coding, which may be used in the video coding standard High Efficiency Video Coding (HEVC).

Description of the Related Art

Context-Adaptive Binary Arithmetic Coding (CABAC) is one of two entropy engines used by the existing video coding standard AVC. CABAC is a method of entropy coding that provides high coding efficiency. Processing in CABAC engine is highly serial in nature. Consequently, in order to decode high bit rate video bit-streams in real-time, the CABAC engine needs to be run at extremely high frequencies which consumes a significant amount of power and in the worst case may not be feasible.

Therefore, there is a need for an improved method and/or apparatus for parallel context processing techniques for high coding efficiency entropy coding in HEVC.

SUMMARY OF THE INVENTION

Embodiments of the present invention relate to a method and apparatus for parallel context processing for example for high coding efficient entropy coding, such as, HEVC. The method comprising retrieving syntax element relating to a block of an image, grouping at least two bins belonging to similar context based on the syntax element, and coding the grouped bins in parallel.

Embodiments of the present invention relate to a method of encoding video information comprising receiving a series of syntax elements comprising an array of transform coefficients related to a block of an image, determining a context for at least a first bin and a second bin of each significant transform coefficient in the array, context encoding the at least a first bin and a second bin of each significant transform coefficient in the array, bypass encoding a Golomb-Rice representation of an additional portion of at least one transform coefficient in the array, bypass encoding a sign indicator for each significant transform coefficient in the array, and constructing a bit stream.

Embodiments of the present invention relate to an encoder comprising a binarizer operable to binarize syntax elements, a context modeler operable to determine a context for a portion of the binarized syntax elements, including at least a first bin and a second bin of each significant transform coefficient in an array of transform coefficients related to a block of an image, and a binary arithmetic coder. The binary arithmetic code comprising a context coding engine operable to context encode the at least a first bin and a second bin of each significant transform coefficient in the array and a bypass coding engine. The bypass coding engine operable to bypass encode a Golomb-Rice representation of an additional portion of at least one transform coefficient in the array and bypass encode a sign indicator for each significant transform coefficient in the array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
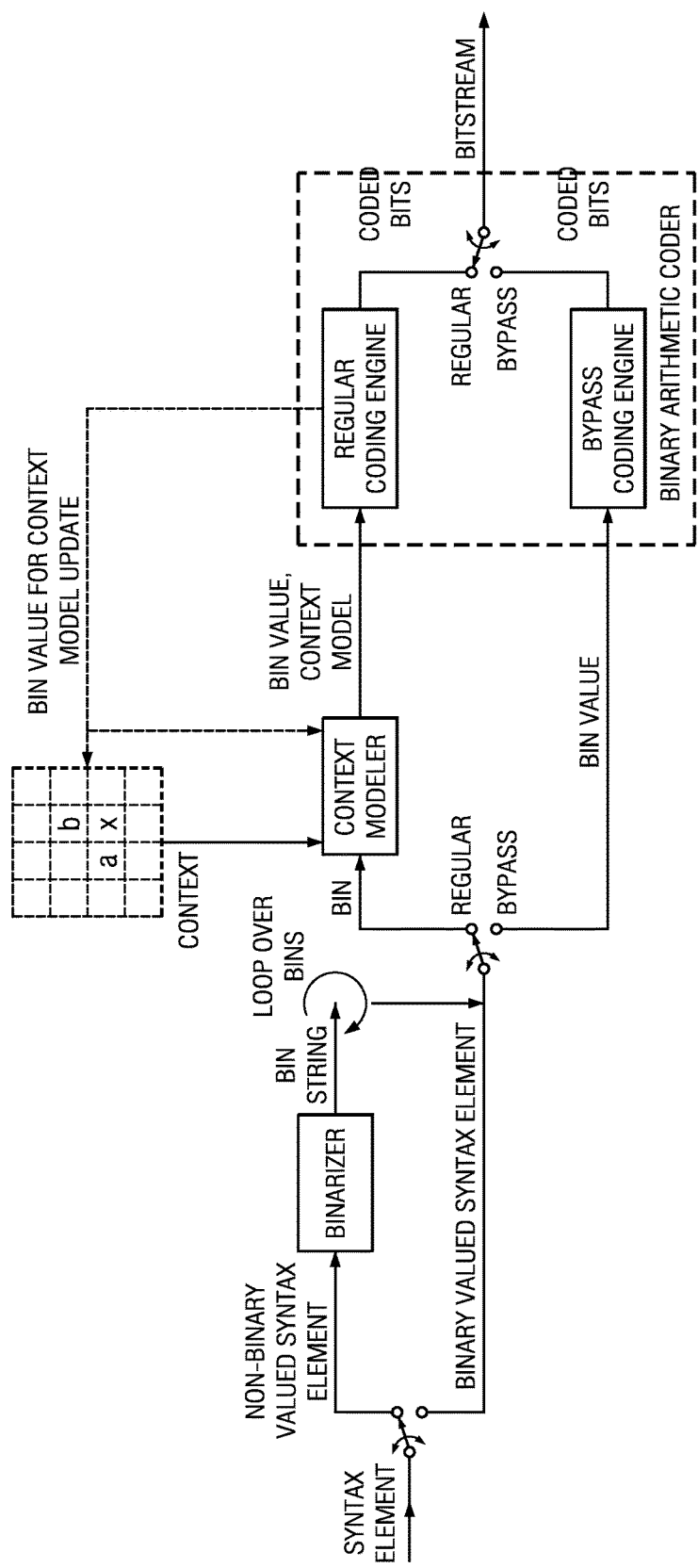
FIG. 1 is an embodiment of a CABAC block diagram.

FIG. 1 is an embodiment of a CABAC block diagram. As shown in FIG. 1, the serial nature in CABAC comes from the following three blocks, a binarizer, a context modeler and a binary arithmetic coder. In the binarizer, bins from many syntax elements, such as, coefficient levels and motion vector differences are coded using variable length coding such as unary coding and exp-Golomb coding. Variable length codes are inherently serial in nature. In the context modeler, the serial dependency comes about since the probability used in the context model for coding the next bin is updated depending on the current bin value. If the current bin value is Least Probable Symbol (LPS), the probability is increased and if the current bin value is Most Probable Symbol (MPS), the probability is decreased. Another source of serial dependency is the context index selection process, where the context index of bin may be determined by the value of previously coded bins. In the binary arithmetic coder (BAC), the arithmetic coding uses interval subdivision. The range, value, offset used to determine the interval on [0, 1] that uniquely identifies the coded stream of bin values are updated in a serial fashion as and when bins get encoded/decoded.

In some embodiments of parallel entropy coding tools, the parallelism proposed may be broadly classified into three categories: (1) Bin-level parallelism, which parallelizes the BAC, (2) Syntax element-level parallelism, which parallelizes the BAC, the context modeler, and the binarizer and (3) Slice-level parallelism.

Figure 2:
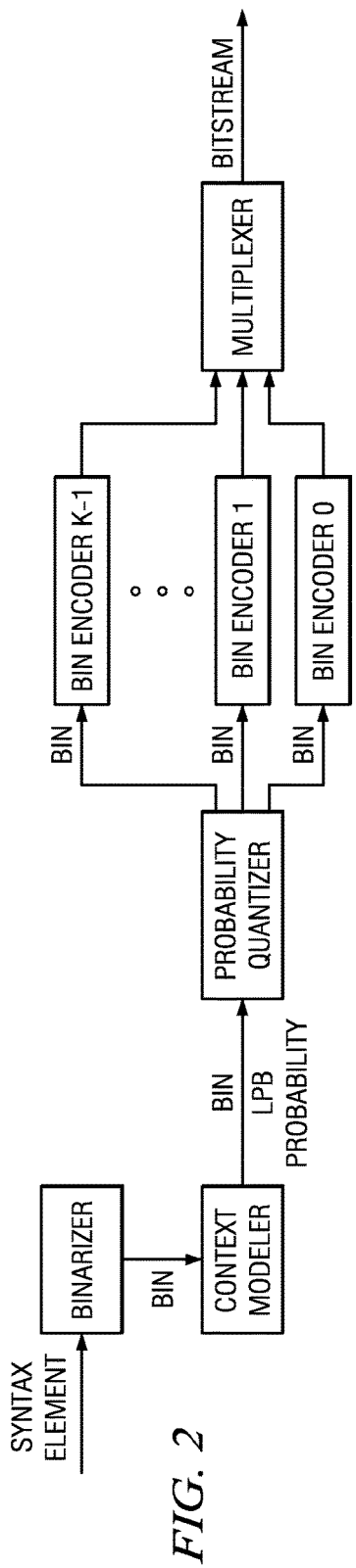
FIG. 2 is an embodiment of a flow diagram depicting PIPE/V2V coding.

A N-bins/cycle coding (NBAC) encodes and decodes N-bins/cycle to achieve N-fold improvement in throughput. The contexts for N-bins are calculated through the use of conditional probabilities. In some HEVC embodiment, the binarizer and context modeler were basically the same as in CABAC of AVC. However, coding schemes are determined variable-to-variable length for coding of the bins. There are two flavors of the scheme: (1) PIPE and (2) V2V. The main difference between the two is the context probabilities are quantized to 12 levels in PIPE and to 64 in V2V. In PIPE/V2V coding scheme, the bins are coded using a parallel bin encoding scheme as shown in FIG. 2. FIG. 2 is an embodiment of a flow diagram depicting PIPE/V2V coding.

Some embodiments that utilize schemes that interleaves the V2V code words from different partial bitstreams into a single bitstream. As a result, a throughput increase of 6× for PIPE in hardware is possible. Such embodiments usually cause an estimated throughput increase of 3× in BAC stage for PIPE hardware implementation for both the parallel and serial versions of PIPE. Since PIPE uses 12 bitstream buffers and V2V uses 64 bitstream buffers, PIPE is usually utilized more often than V2V from a complexity purpose. However in both cases, there is no estimated overall throughput improvement in the entropy coder due to serial bottlenecks in context processing and binarization.

The NBAC, PIPE, V2V schemes reduces serial dependency in the BAC block. However, the serial dependency in the context modeler and binarizer still remain. So, the effective throughput increase that can be achieved in entropy coding is limited. Hence, techniques for parallelization of context processing (PCP) may be utilized.

In syntax element partitioning, syntax elements such as macroblock type, motion vectors, transform coefficients, significant coefficient map etc. are divided into N groups and each group is coded separately. The context selection and adaptation within a group happens in parallel leading to a potential N-fold speed up in context modeler if the various partitions are balanced in terms of the number of bins they process. In practice, the various partitions are not balanced and the throughput improvement is less than a factor of N.

Figure 3:
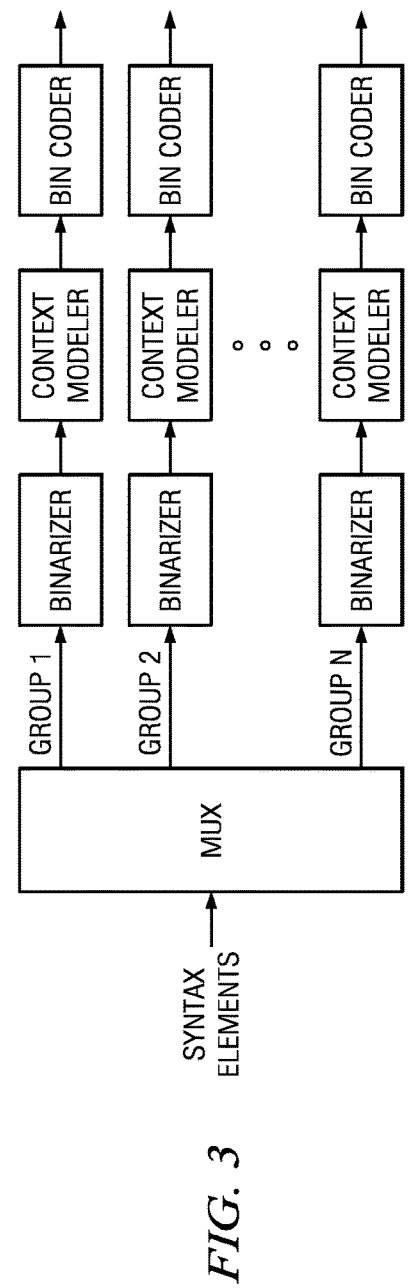
FIG. 3 is an embodiment of a syntax element partitioning.

FIG. 3 is an embodiment of a syntax element partitioning. FIG. 3 shows the block diagram of a system with N syntax partitions. The bin coders can be arithmetic coders or PIPE/V2V coders. If PIPE/V2V coders are used as the bin coders, the serial version of PIPE interleaving codewords maybe preferable for reducing the number of bitstream buffers.

Syntax element partitioning results showed throughput improvement and BD-Rate. In this embodiment, significance map coding is carried out in AVC CABAC. In such an embodiment, the last significant coefficient flag is transmitted when the related coefficient is determined to be significant. The coefficient is the output of a block after transform and quantization. Also, a coefficient is significant when it has value that is non-zero.

Figure 4A:
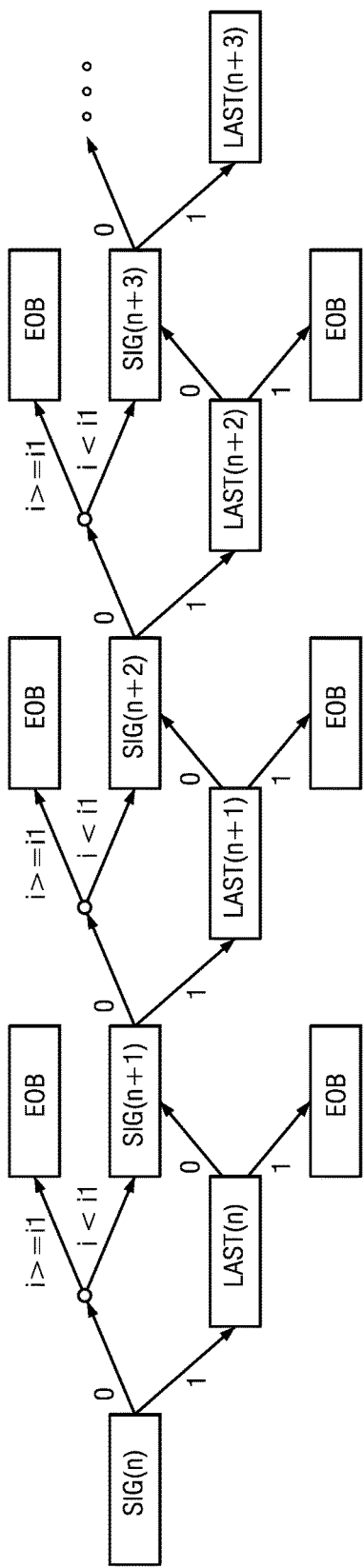
FIG. 4A is an embodiment of a flow diagram depicting a parallelization of context processing for significance map utilizing speculative computing at each bin.

This technique introduces serial dependency in decoding of significance map. When throughput improvement is needed, speculative computation are performed at every bin. Such computations leads to complex logic, as shown in FIG. 4A. FIG. 4A is an embodiment of a flow diagram depicting a parallelization of context processing for significance map utilizing speculative computing at each bin. Speculative computation at every bin also results in increased power consumption.

Figure 4B:
FIG. 4B is an embodiment of a flow diagram depicting a parallelization of context processing for significance map utilizing speculative computing at a fifth bin.

Significance map coding are parallelized by transmitting the last significant coefficient flag once per certain number of bins. For example, FIG. 4B is an embodiment of a flow diagram depicting a parallelization of context processing for significance map utilizing speculative computing at a fifth bin. If all of the significant coefficient flag is zero, then the last significant coefficient flag is not transmitted.

Such an embodiment reduces the number of last bins that need to be transmitted, but it increases the number of significant bins that need to be transmitted. However, there is about a 5% overall reduction in the number of significance map bins that need to be processed. Our algorithm parallelizes about 21.65% of the bins for largest coding unit (LCTB).

Table 1 shows the distribution of bins used by different syntax element types as a percent of total bins for a LCTB. The bin distribution was obtained by measuring bins in bitstreams generated, for example, by TMuC-0.1 using cfg files in cfp-fast directory. Shown in Table 1 is the distribution of bins used by different syntax element type as a percent of total bins for a LCU.

TABLE 1

| Bins used per syntax | Average number of bins |
| --- | --- |
| SigMap | 21.65% |
| SigLast | 8.35% |
| LevelAbs | 16.67% |
| LevelSign | 9.92% |

The coefficient coding is usually carried out in AVC CABAC. The context used for the absolute value of the coefficient minus one, known as the coefficient level (1) depends on the position of the bin. Thus, when the binIdx is 0 (i.e. first bin of the coefficient level), then the context is derived by (ctxIdxInc=((numDecodAbsLevelGt1 !=0) ? 0: Min(4, 1+numDecodAbsLevelEq1))); Otherwise, context is divided by (ctxIdxInc=5+Min(4−((ctxBlockCat==3) ? 1:0), numDecodAbsLevelGt1)). Context processing for the first bin in the absolute values of the coefficient minus one (i.e. Coeff level BinIdx 0 in FIG. 7 is different from the other bins in the coefficient level.

Figure 7:
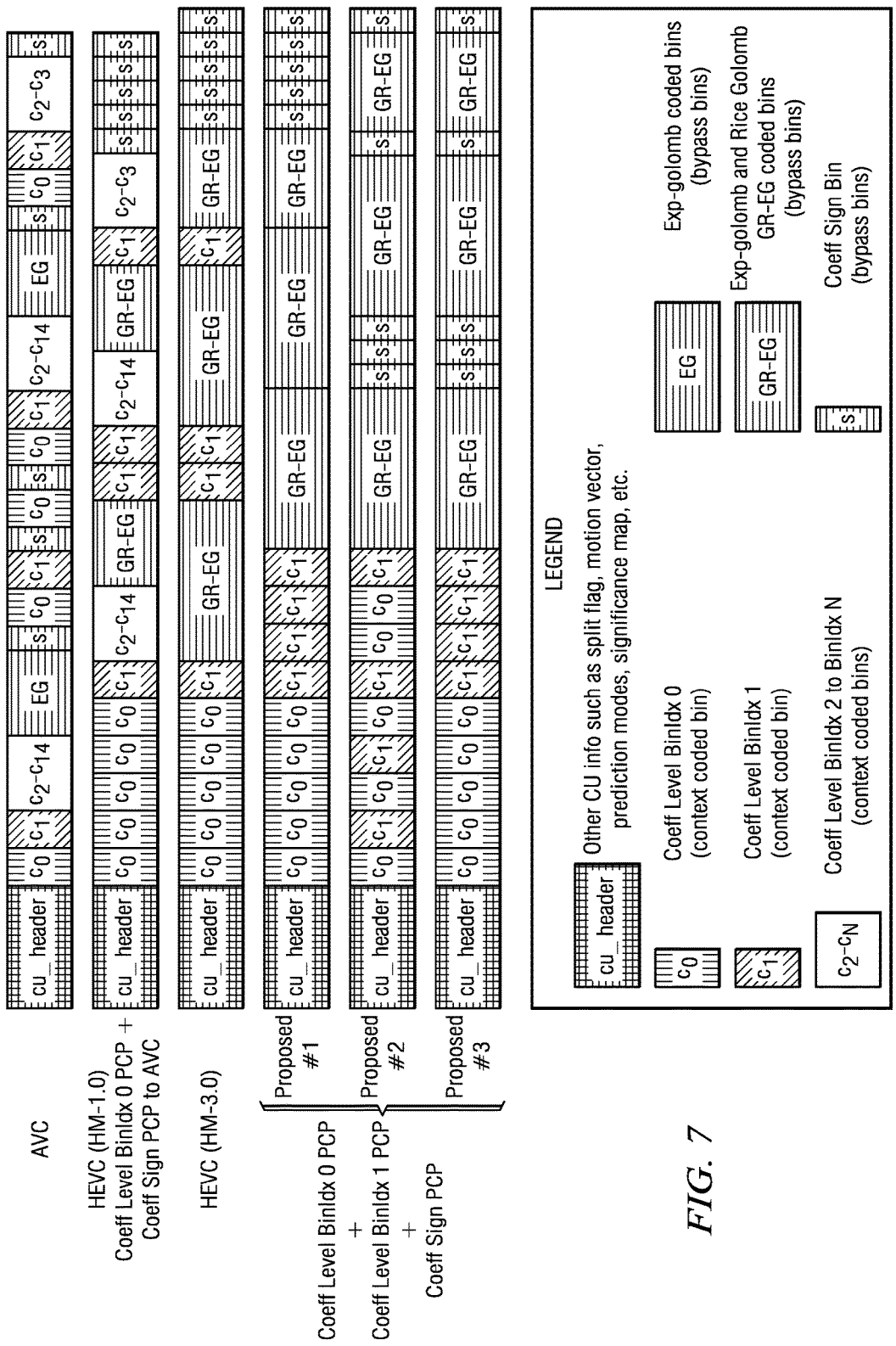
FIG. 7 is an embodiment of a proposed approach on order of syntax elements.

In one embodiment, the encoding Coeff Level BinIdx 0 occurs in a separate bin-plane as shown in the second row of FIG. 7. The advantage in the context processing, because it can be carried out in parallel to the rest of the context processing i.e. the context processing for all the Coeff Level BinIdx 0 for all the coefficients level in a block, may be carried out in parallel to bin processing of Coeff Level BinIdx 0 before the decoding of the other bins in the coefficient level. This is referred to as Coeff Level BinIdx PCP.

Figure 5:
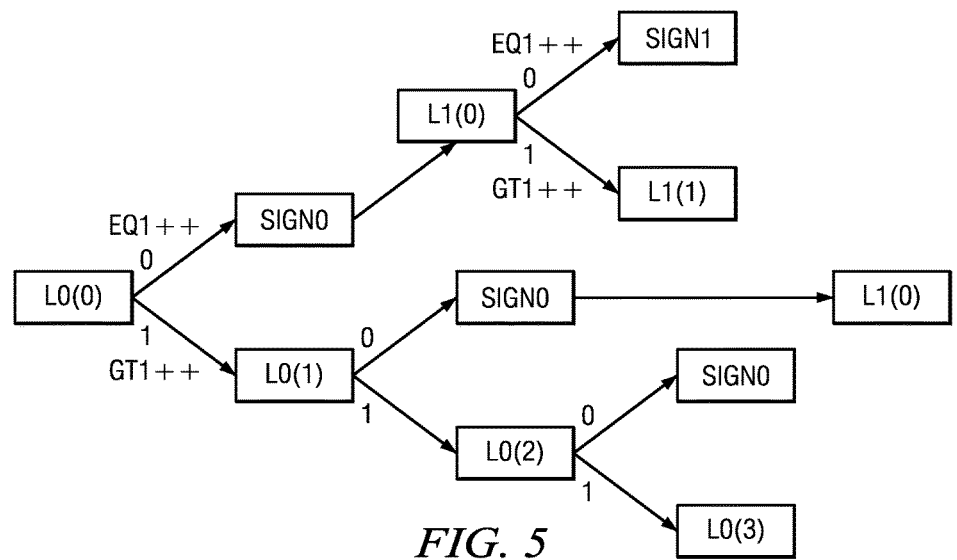
FIG. 5 is an embodiment of a flow diagram depicting a method for context processing tree for level coding in AVC.

In AVC, sign information is interleaved along with level information as shown in FIG. 5. This leads to inefficiency in parallel context processing. FIG. 5 is an embodiment of a flow diagram depicting a method for context processing tree for level coding in AVC. In FIG. 5, the context processing tree that needs to be pre-calculated at each bin to achieve 4× parallelism in context processing of level in AVC. The context processing that happens at every SIGN node is wasteful since SIGN is coded in bypass mode. Table 3 shows the distribution of level of coefficients obtained by measuring levels in bitstreams generated by, for example, a TMuC-0.1 using cfg files in cfp-fast directory.

TABLE 3

| Level | Probablity of occurrence |
| --- | --- |
| 1 | 0.76 |
| 2 | 0.15 |
| 3 | 0.05 |

TABLE 3-continued

| Level | Probablity of occurrence |
|---|---|
| 4 | 0.02 |
| 5 | 0.01 |

Figure 6:
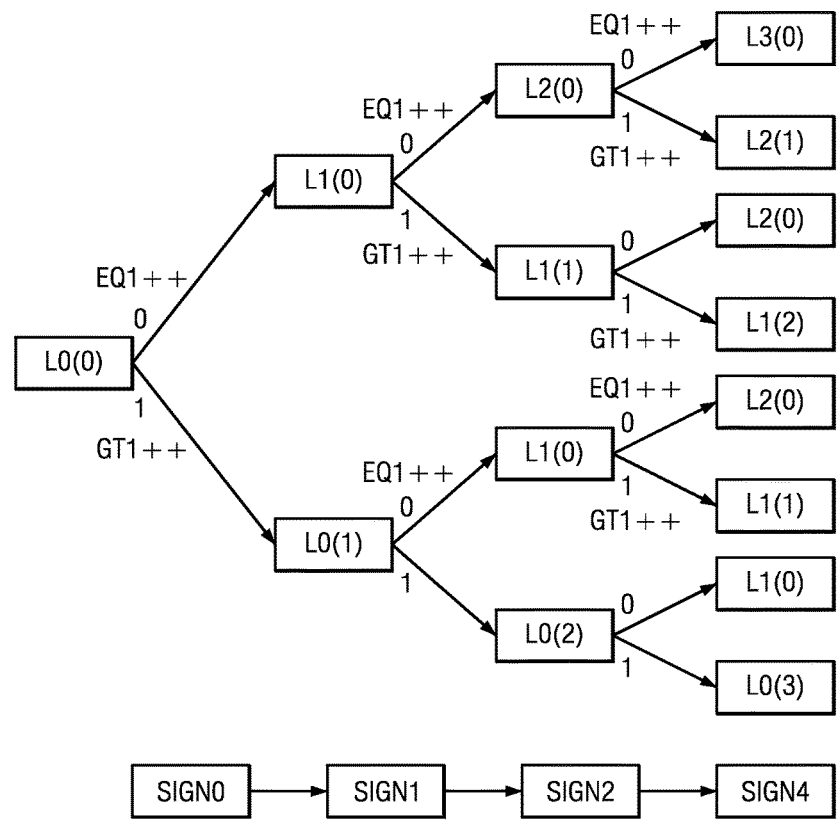
FIG. 6 is an embodiment of a flow diagram depicting context processing tree for levels when SIGN is coded in separate bin-plane.

Level=1 occurs with the highest probability, so the most probable path in the context processing tree of FIG. 6 is L0(0)→SIGN0→L1(0)→SIGN1. For this particular path, the context processing efficiency is 50%, meaning half the context processing is wasteful. On the average, for the context processing tree of FIG. 6. and assuming the level distribution of Table 3, the context processing efficiency is 60%. FIG. 6 is an embodiment of a flow diagram depicting context processing tree for levels when SIGN is coded in separate bin-plane. In FIG. 6, the context processing tree for levels when sign is coded in separate bin-plane. As can be seen in FIG. 6, context processing efficiency is 100%. This is also illustrated in FIG. 7 where all sign bins (i.e. Coeff Sign Bins) are coded on separate bin plans; this is referred to as Coeff Sign PCP.

In some embodiment, the first two bins in the coefficient level are context coded. The rest of the bins, such as, coefficient sign bins and Golomb-Rice+Exp-Golomb (GR-EG) binarized bins, are bypass coded. As an extension of "Coeff Level BinIdx 0 PCP", the second bin in the absolute value of the coefficient minus 1 (i.e. Coeff Level BinIdx 1) is also coded in a separate bin-plane. The Coeff Sign Level can be interleaved or be on a separate bin-plane with GR-EG bins.

FIG. 7 is an embodiment of a proposed approach on order of syntax elements. FIG. 7 illustrates a data ordering based on Coeff Level BinIdx 0 PCP, Coefficient Sign PCP, and Coeff Level BinIdx 1 PCP. Bypass coded bins are Coefficient Sign & GR-EG bins. The first row shows original ordering used in H.264/AVC. The ordering of HEVC (HM-1.0), in which the proposed Coeff Level BinIdx 0 PCP and Coefficient Sign PCP was adopted, is shown in the second row. Here c0 and sign can be placed in partitions that can be coded in parallel with the other bins. The new coefficient level binarization and coding introduced in HM-3.0 is shown in the third row. Finally, the proposed Coeff Level BinIdx 1 PCP is shown in the fourth row. Here c0, c1 and sign+GR-EG bins can be placed in partitions that can be coded in parallel with the other bins. Note that sign and GR-EG bins (i.e. exp-golomb and golomb rice bins of coeff) can be placed in the same partition as all are bypass coded.

Since bypass coding is simpler than context coding, bypass bins can be coded faster than context coded bins. In particular, many bypass bins can be coded in a cycle which can increase the throughput of the CABAC. With Coeff Level BinIdx 1 PCP all bypass coded bins for coefficients in a given TU are grouped together which increases throughput impact of parallel bypass bins processing.

Variants of this approach include separating GR-EG +sign bins from the Coeff Level BinIdx 0 and Coeff Level BinIdx 1, but keeping the GR-EG +sign bins interleaved and keeping the Coeff Level BinIdx 0 and Coeff Level Bin Idx 1 bins interleaved as shown in proposal #2 in FIG. 11. This eliminates the additional of loops required to separate the Coeff Level BinIdx 0 from Coeff Level BinIdx 1, and Coefficient Sign from RG-EG bins. Alternatively, proposal #3 in FIG. 7 keeps GR-EG and Coefficient sign bins interleaved, to reduce the loops, and keeps Coeff Level BinIdx 0 and Coeff Level BinIdx 1 in separate partitions. This is due to the fact that the context selection for Coeff Level BinIdx 0 and Coeff Level BinIdx 1 are more complex and keeping the two separate helps to improve parallel processing as described in section Coeff Level BinIdx 0 PCP. This approach can also be applied to other type of syntax elements such as motion vector difference. The bypass bins of the motion vectors difference can be coded together on a separate bin-plane than the context coded bins.

While the foregoing is directed to embodiments of the present invention, other and further embodiments of the invention may be devised without departing from the basic scope thereof, and the scope thereof is determined by the claims that follow.

What is claimed is:

1. A method of encoding video information comprising:
receiving a series of syntax elements comprising an array of transform coefficients related to a block of an image;
determining a context for at least a first bin and a second bin of each significant transform coefficient in the array;
context encoding the at least a first bin and a second bin of each significant transform coefficient in the array;
bypass encoding a Golomb-Rice representation of an additional portion of at least one transform coefficient in the array;
bypass encoding a sign indicator for each significant transform coefficient in the array;
constructing a bit stream comprising:
the context encoded first bins of each significant transform coefficient in the block;
the context encoded second bins of each significant transform coefficient in the block immediately following the context encoded first bins of each significant transform coefficient in the block;
the bypass encoded sign indicators for each significant transform coefficient in the array grouped together in the bit stream and after the first bin and second bin; and
the bypass encoded Golomb-Rice representations of the at least a most significant portion of at least one transform coefficient in the array, all Golomb-Rice representations for the array grouped together in the bit stream and after the first bin and second bin; and
transmitting the bit stream.

2. The method of claim 1, comprising:
encoding header information into the bit steam before the context encoded first bin in the bit steam.

3. The method of claim 1, comprising:
encoding a significance map into a header portion of the bit stream located before the context encoded first bin in the bit steam.

4. The method of claim 1, comprising:
encoding motion vector information into a header portion of the bit stream located before the context encoded first bin in the bit steam.

5. The method of claim 1, comprising:
encoding prediction information into a header portion of the bit stream located before the context encoded first bin in the bit steam.

6. The method of claim 1, bypass encoding a Golomb-Rice representation of an additional portion of at least one transform coefficient in the array only performed for transform coefficients that are not completely magnitude encoded by context encoding.

7. The method of claim 1, the bypass encoded sign indicators for each significant transform coefficient in the array grouped together in the bit stream after all of the bypass encoded Golomb-Rice representations of transform coefficients in the array.

8. An encoder comprising:
a binarizer operable to binarize syntax elements;
a context modeler operable to determine a context for a portion of the binarized syntax elements, including at least a first bin and a second bin of each significant transform coefficient in an array of transform coefficients related to a block of an image;
a binary arithmetic coder comprising:
  a context coding engine operable to context encode the at least a first bin and a second bin of each significant transform coefficient in the array; and
  a bypass coding engine operable to:
    bypass encode a Golomb-Rice representation of an additional portion of at least one transform coefficient in the array; and
    bypass encode a sign indicator for each significant transform coefficient in the array;
the binary arithmetic coder operable to group coded elements to form a bit stream having:
  a group of context encoded first bins of each significant transform coefficient in the block;
  a group of context encoded second bins of each significant transform coefficient in the block immediately following the group of context encoded first bins of each significant transform coefficient in the block;
  a group of bypass encoded sign indicators for each significant transform coefficient in the array in the bit stream and after the group of context encoded first bins and the group of context encoded second bins; and
  a group of bypass encoded Golomb-Rice representations of the at least a most significant portion of at least one transform coefficient in the array in the bit stream and after the group of context encoded first bins and the group of context encoded second bins.

9. The encoded of claim 8, the binary arithmetic coder further operable to encode header information into the bit steam before the context encoded first bin in the bit steam.

10. The encoded of claim 8 the binary arithmetic coder further operable to encode a significance map into a header portion of the bit stream located before the context encoded first bin in the bit steam.

11. The encoded of claim 8 the binary arithmetic coder further operable to encode a significance map into a header portion of the bit stream only when at least one transform coefficient in the array is non-zero.

12. The encoded of claim 8 the binary arithmetic coder further operable to encode motion vector information into a header portion of the bit stream located before the context encoded first bin in the bit steam.

13. The encoded of claim 8 the binary arithmetic coder further operable to encode prediction information into a header portion of the bit stream located before the context encoded first bin in the bit steam.

14. The encoded of claim 8 the bypass coding engine operable to bypass encode a Golomb-Rice representation of an additional portion of at least one transform coefficient in the array only for transform coefficients that are not completely magnitude encoded by context encoding.

15. The encoded of claim 8 the binary arithmetic coder operable to group encoded sign indicators for each significant transform coefficient in the array together in the bit stream after all of the bypass encoded Golomb-Rice representations of transform coefficients in the array.

16. A method of encoding video information comprising:
receiving a series of syntax elements comprising an array of transform coefficients related to a block of an image;
determining a context for at least a first bin and a second bin of each significant transform coefficient in the array;
context encoding the at least a first bin and a second bin of each significant transform coefficient in the array;
bypass encoding a Golomb-Rice representation of an additional portion of any transform coefficients that are not completely magnitude encoded by the context encoding;
bypass encoding a sign indicator for each significant transform coefficient in the array;
constructing a bit stream comprising:
  a header portion comprising a significance map, motion vector information, and prediction information
  the context encoded first bins of each significant transform coefficient in the block following the header portion;
  the context encoded second bins of each significant transform coefficient in the block immediately following the context encoded first bins of each significant transform coefficient in the block;
  the bypass encoded sign indicators for each significant transform coefficient in the array grouped together in the bit stream and after the first bin and second bin; and
  the bypass encoded Golomb-Rice representations of the at least a most significant portion of at least one transform coefficient in the array, all Golomb-Rice representations for the array grouped together in the bit stream and after the first bin and second bin; and
transmitting the bit stream.

* * * * *